US012200463B2

(12) United States Patent
Guo

(10) Patent No.: US 12,200,463 B2
(45) Date of Patent: Jan. 14, 2025

(54) LOUDSPEAKER AND EARPHONE

(71) Applicant: GOERTEK INC., Shandong (CN)

(72) Inventor: Xiaodong Guo, Shandong (CN)

(73) Assignee: GOERTEK INC., Shandong (CN)

( * ) Notice: Subject to any disclaimer, the term of this patent is extended or adjusted under 35 U.S.C. 154(b) by 260 days.

(21) Appl. No.: 17/996,463

(22) PCT Filed: Dec. 5, 2020

(86) PCT No.: PCT/CN2020/134131
§ 371 (c)(1),
(2) Date: Oct. 18, 2022

(87) PCT Pub. No.: WO2021/258653
PCT Pub. Date: Dec. 30, 2021

(65) Prior Publication Data

US 2023/0224642 A1 Jul. 13, 2023

(30) Foreign Application Priority Data

Jun. 22, 2020 (CN) ......................... 202021184921.5

(51) Int. Cl.
*H04R 9/04* (2006.01)
*H04R 1/10* (2006.01)
(Continued)

(52) U.S. Cl.
CPC ............... *H04R 9/046* (2013.01); *H04R 1/10* (2013.01); *H04R 7/04* (2013.01); *H04R 9/027* (2013.01); *H04R 9/06* (2013.01)

(58) Field of Classification Search
CPC . H04R 9/046; H04R 1/10; H04R 7/04; H04R 9/027; H04R 9/06; H04R 1/1058; H04R 7/10; H04R 9/047; H04R 9/025
See application file for complete search history.

(56) References Cited

U.S. PATENT DOCUMENTS

2011/0150265 A1* 6/2011 Pan .......................... H04R 9/06 381/400
2020/0413201 A1* 12/2020 Zhao ...................... H04R 1/021

FOREIGN PATENT DOCUMENTS

CN 101483798 A 7/2009
CN 207200969 U 4/2018
(Continued)

*Primary Examiner* — Tuan D Nguyen
(74) *Attorney, Agent, or Firm* — LKGlobal | Lorenz & Kopf, LLP

(57) ABSTRACT

A loudspeaker and an earphone are disclosed. The loudspeaker comprises: a housing; and a vibration system and a magnetic circuit system that are accommodated in the housing. The vibration system comprises a diaphragm, a centering support piece and a vibrating voice coil. The centering support piece comprises a mounting part correspondingly connected with the central part of the diaphragm. The magnetic circuit system comprises a magneto-conduct yoke, a central magnetic circuit part and a side magnetic circuit part, and a coupling magnetic circuit part located above the central magnetic circuit part, and a magnetic gap accommodating the vibrating voice coil is formed between the central magnetic circuit part and the side magnetic circuit part. When the coupling voice coil is energized, upward and downward forces are generated by magnetic field coupling of the coupling voice coil and the coupling magnetic circuit part. The loudspeaker has good sound effect.

18 Claims, 7 Drawing Sheets

(51) Int. Cl.

| | |
|---|---|
| ***H04R 7/04*** | (2006.01) |
| ***H04R 9/02*** | (2006.01) |
| ***H04R 9/06*** | (2006.01) |

(56) References Cited

FOREIGN PATENT DOCUMENTS

| | | | |
|---|---|---|---|
| CN | 208285531 | U | 12/2018 |
| WO | 2020001229 | A1 | 1/2020 |

* cited by examiner

LOUDSPEAKER AND EARPHONE

CROSS-REFERENCE TO RELATED APPLICATIONS

This Application is a U.S. National-Stage entry under 35 U.S.C. § 371 based on International Application No. PCT/CN2020/134131, filed Dec. 5, 2020 which was published under PCT Article 21(2) and which claims priority to Chinese Application No. 202021184921.5, filed Jun. 22, 2020, which are all hereby incorporated herein in their entirety by reference.

TECHNICAL FIELD

This application pertains to the field of electroacoustic technology, in particular to a loudspeaker and an earphone using the loudspeaker.

BACKGROUND

In order to adapt to the miniaturization and multi-function trends of various audio equipment and information communication equipment, the micro sound generating devices used in such equipment should be more miniaturized, and their cooperation with other components around it should be more compact. Especially as mobile phones are becoming lighter and thinner, the micro sound generating devices used require not only miniaturization, but also high-quality sound and stereo. The vibration system and magnetic circuit system used in micro acoustic devices are directly related to the sound quality of micro sound generating devices. In conventional micro sound generating devices, the vibration system comprises a diaphragm and a voice coil attached to the diaphragm, and the magnetic circuit system comprises a magnetic bowl and steel magnets disposed in the magnetic bowl.

In conventional micro sound generating devices, the diaphragm comprises a central part and a folded ring part disposed around the central part. The high-frequency performance is improved by attaching a high modulus vibrating plate on the central part. The high-frequency performance of sound generating in the vibration system is mainly adjusted by the material and shape of the vibrating plate, and the adjustment space is limited, which limits the acoustic performance of the micro sound generating device using the vibration system. In addition, other objects, desirable features and characteristics will become apparent from the subsequent summary and detailed description, and the appended claims, taken in conjunction with the accompanying drawings and this background.

SUMMARY

The main object of the present disclosure is to provide a loudspeaker, which aims to improve the acoustic performance of the loudspeaker.

To achieve the above purpose, the loudspeaker provided by the present disclosure comprises:

- a housing; and
- a vibration system and a magnetic circuit system that are accommodated in the housing;
- wherein the vibration system comprises a diaphragm, a centering support piece and a vibrating voice coil, two opposite sides of the centering support piece are respectively connected with the diaphragm and the vibrating voice coil, and the centering support piece is provided thereon with a coupling voice coil;
- the centering support piece comprises a mounting part correspondingly connected with the central part of the diaphragm, and the coupling voice coil is provided on the mounting part;
- the magnetic circuit system comprises a magneto-conduct yoke, a central magnetic circuit part and a side magnetic circuit part that are provided on the magneto-conduct yoke, and a coupling magnetic circuit part located above the central magnetic circuit part, and a magnetic gap accommodating the vibrating voice coil is formed between the central magnetic circuit part and the side magnetic circuit part;
- when the coupling voice coil is energized, upward and downward forces are generated by magnetic field coupling of the coupling voice coil and the coupling magnetic circuit part.

In the technical solution of the present disclosure, the centering support piece is provided in the loudspeaker, the opposite sides of the centering support piece are respectively connected with the diaphragm and the vibrating voice coil, the coupling voice coil is provided on the centering support piece, and the coupling magnetic circuit part corresponding to the coupling voice coil is provided above the central magnetic circuit part. Thus, when the loudspeaker works, the coupling voice coil is energized to generate magnetism and can be magnetically coupled with the coupling magnetic circuit part, so that when the vibrating voice coil drives the diaphragm to vibrate and make a sound, the coupling voice coil and the coupling magnetic circuit part are magnetically coupled to push and pull and expand the diaphragm, thereby changing the vibration state of the high-frequency zone of the diaphragm (suppressing the high-frequency split vibration), and finally improving the high-frequency performance of the loudspeaker.

Optionally, the coupling voice coil is of a flat shape, and is formed by arranging and winding wirings along a plane where the mounting part is located.

Optionally, the centering support piece comprises a frame part provided at edges, the mounting part provided at center, and an elastic part connecting the frame part and the mounting part at two sides respectively.

Optionally, the frame part and the elastic part are provided thereon with a first conductive wiring electrically connected with the coupling voice coil and a second conductive wiring electrically connected with the vibrating voice coil.

Optionally, the coupling voice coil is formed by etching, printing or plating.

Optionally, the coupling voice coil is embedded inside the centering support piece; or

- the coupling voice coil is located on a surface of the centering support piece that is facing the diaphragm.

Optionally, the coupling magnetic circuit part comprises spaced magnets, a gap is formed between adjacent magnets, and the coupling voice coil comprises a winding part corresponding to the gap.

Optionally, the winding part is ring-shaped, the coupling magnetic circuit part comprises ring-shaped magnets provided at intervals, and magnetic poles of two adjacent magnets facing the diaphragm are different;

- or, the winding part is of a straight line shape, the coupling magnetic circuit part comprises long striped magnets provided at intervals, and magnetic poles of two adjacent magnets facing the diaphragm are different.

Optionally, the central magnetic circuit part comprises a central magnet and a magneto-conduct plate attached to the central magnet, and the coupling magnetic circuit part is fixedly connected to a surface of the magneto-conduct plate facing the diaphragm.

The present disclosure also provides an earphone which comprises a loudspeaker as described above.

BRIEF DESCRIPTION OF DRAWINGS

The present invention will hereinafter be described in conjunction with the following drawing figures, wherein like numerals denote like elements, and.

In the drawings.

Figure 1:
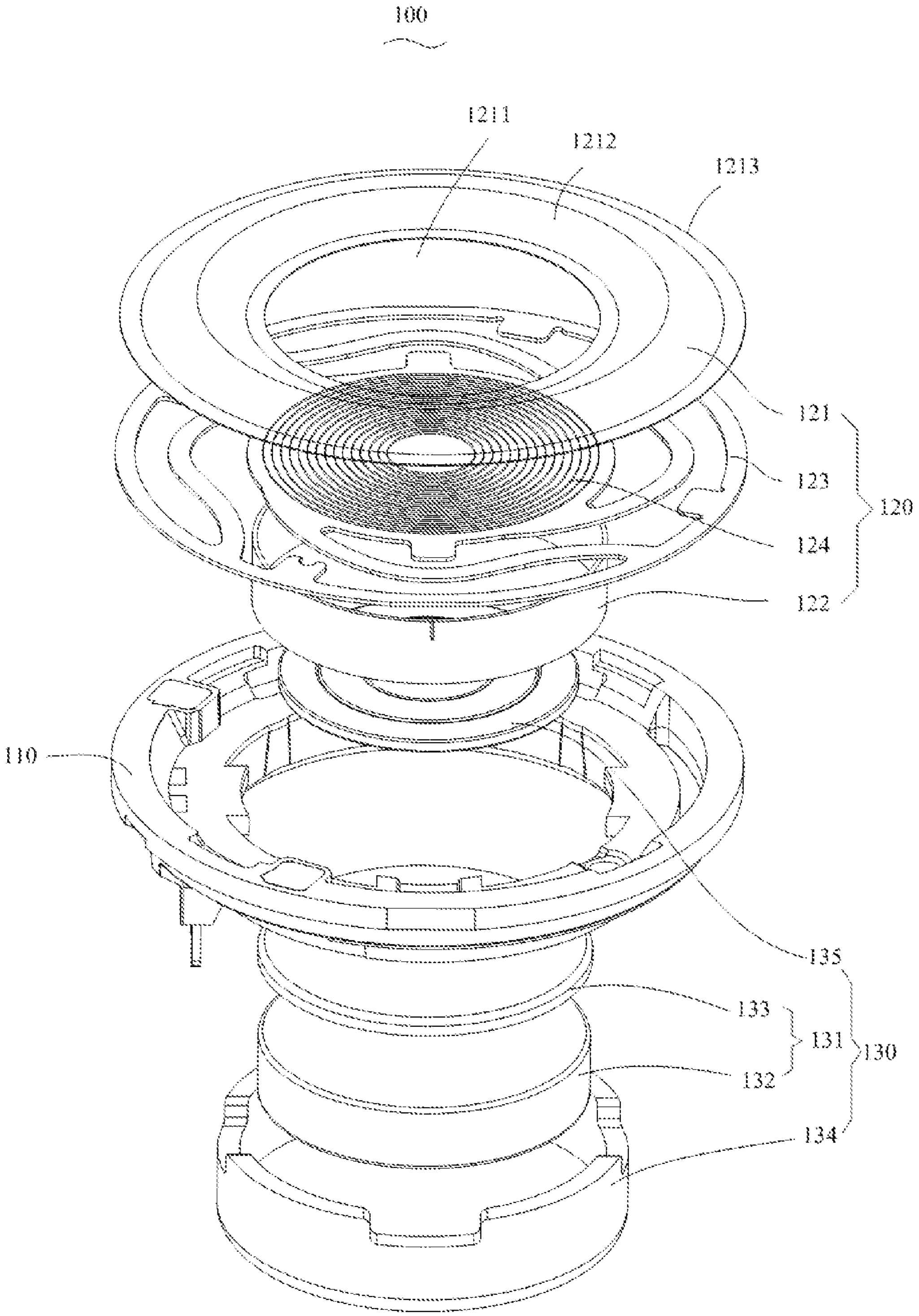
FIG. 1 is an exploded view of the structure of a loudspeaker according to an embodiment of the present disclosure.

100: loudspeaker; 110: housing; 120: vibration system; 121: diaphragm; 1211: central part; 1212: bent ring part; 1213: fixing part; 122: vibrating voice coil; 1221: main part; 1222: connecting part; 123: centering support piece; 1231: frame part; 1232: mounting part; 1233: elastic part; 124: coupling voice coil; 1241: winding part; 130: magnetic circuit system; 131: central magnetic circuit part; 132: steel magnet; 133: magneto-conduct plate; 134: magneto-conduct yoke; 1341: bottom wall; 1342: side wall; 135: coupling magnetic circuit part; 1351: magnet; 1352: gap.

The object realization, functional features and advantages of the present disclosure will be further described in combination with the embodiments and with reference to the accompanying drawings.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The technical solutions in embodiments of the present disclosure will be described clearly and completely below with reference to the drawings in the embodiments of the present disclosure. Obviously, the embodiments as described below are merely part of, rather than all, embodiments of the present disclosure. Based on the embodiments of the present disclosure, any other embodiment obtained by a person of ordinary skill in the art without paying any creative effort shall fall within the protection scope of the present disclosure.

In the present disclosure, unless otherwise expressly specified and defined, the terms “connected”, “fixed” and the like should be understood in a broad sense. For example, it may be fixedly connected, or removably connected, or integrally connected; it may also be mechanically connected or electrically connected; it may also be directly connected or indirectly connected through a middleware; it may also be internally communicated or interacted between two components. For a person of ordinary skill in the art, the specific meaning of these terms in the present disclosure should be understood according to specific situations.

In addition, in the present disclosure, the terms “first”, “second”, etc. are used for descriptive purposes only and are not to be construed as indicating or implying relative importance or implicitly indicating the number of indicated technical features. Thus, a feature with “first” or “second” may explicitly or implicitly include at least one such a feature. In addition, the technical solutions in various embodiments of the present disclosure can be combined with each other if their combination is realizable to a person of ordinary skill in the art. When the combination of technical solutions is contradictory or cannot be realized, it should be considered that such a combination of technical solutions does not exist and is not within the scope of protection claimed in the present disclosure.

The present disclosure provides a loudspeaker 100.

Figure 2:
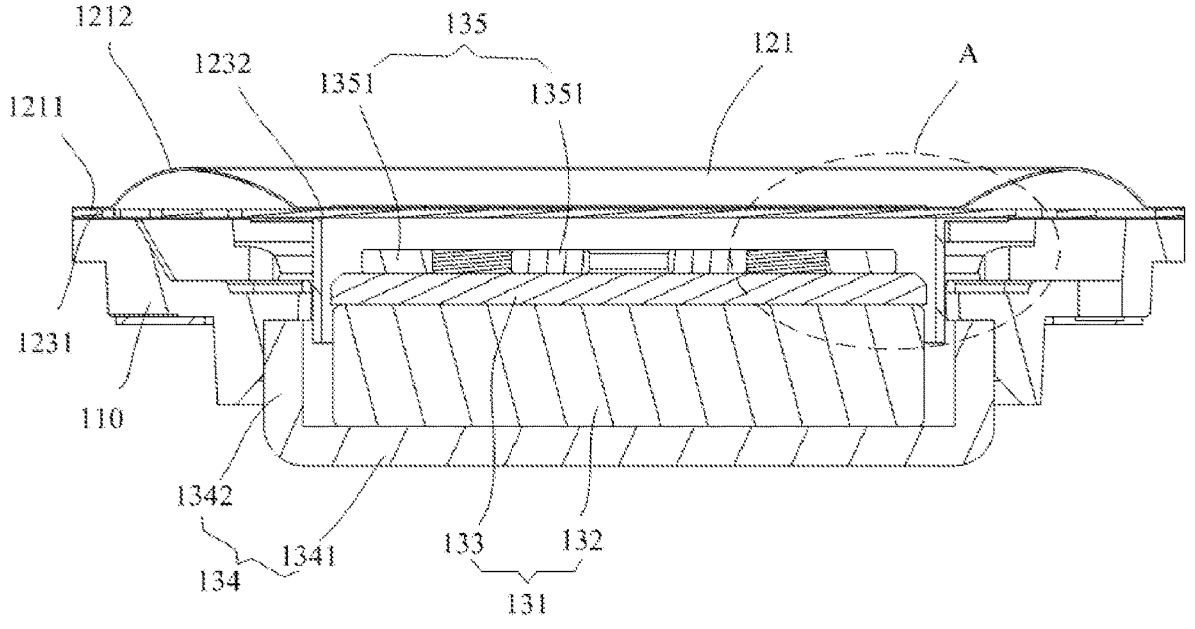
FIG. 2 is a sectional view of the loudspeaker in FIG. 1.
Figure 3:
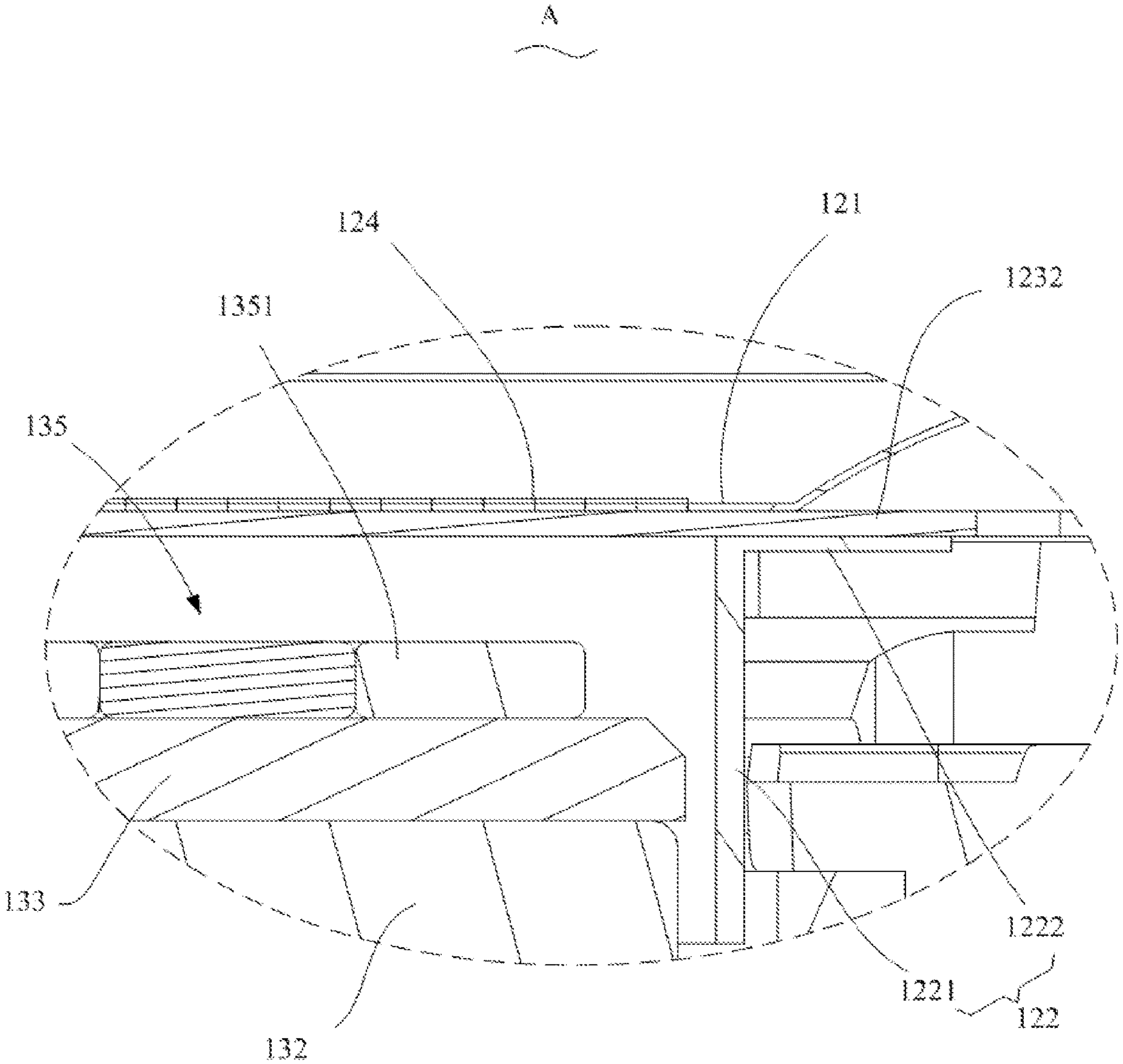
FIG. 3 is an enlarged view of a portion A in FIG. 2.

Referring to FIGS. 1 to 3, in an embodiment of the present disclosure, the loudspeaker 100 comprises: a housing 110; and a vibration system 120 and a magnetic circuit system 130 that are accommodated in the housing 110. The vibration system 120 comprises a diaphragm 121, a vibrating voice coil 122 and a centering support piece 123. The opposite sides of the centering support piece 123 are respectively connected with the diaphragm 121 and the vibrating voice coil 122, and the centering support piece 123 is provided thereon with a coupling voice coil 124. The magnetic circuit system 130 comprises: a magneto-conduct yoke 134; a central magnetic circuit part 131 and a side magnetic circuit part that are disposed on the magneto-conduct yoke 134; and a coupling magnetic circuit part 135 disposed above the central magnetic circuit part 131. A magnetic gap accommodating the vibrating voice coil 122 is formed between the central magnetic circuit part 131 and the side magnetic circuit part. When the coupling voice coil 124 is energized, upward and downward forces are generated by the magnetic field coupling of the coupling voice coil 124 and the coupling magnetic circuit part 135.

In order to simplify the description, a side of the diaphragm 121 that is away from the magnetic circuit system 130 is called an upper side, and a side of the diaphragm 121 that is facing the magnetic circuit system 130 is called a lower side.

The housing 110 is generally made of plastic and defines an outer profile of the whole loudspeaker 100. The housing 110 is in the shape of a horn which is open at both the top and bottom. The vibration system 120 and the magnetic circuit system 130 are disposed inside of the housing 110, the vibration system 120 is installed from the top of the housing 110, and the magnetic circuit system 130 is installed from the bottom of the housing 110. The housing 110 is further provided thereon with a pressure relief hole which is communicated with an inner cavity of the housing 110. The pressure relief hole is used to reduce the vibration resistance of the diaphragm 121 when the diaphragm 121 agitates the air. The magneto-conduct yoke 134 in the magnetic circuit system 130 shown in the drawings of the application is in a bowl shape. The magnetic circuit system 130 further comprises: a central magnetic circuit part 131 disposed on an inner side of the magneto-conduct yoke 134, and a side magnetic circuit part facing the central magnetic circuit part 131, and a magnetic gap is formed between the central magnetic circuit part 131 and the side magnetic circuit part. The central magnetic circuit part 131 comprises a steel magnet 132 and a magneto-conduct plate 133 covering an upper surface of the steel magnet 132. The magneto-conduct yoke 134 is in a bowl shape, and comprises a bottom wall 1341 and a cylindrical side wall 1342 connected with the bottom wall 1341. The side wall 1342 is connected with the bottom of the housing 110 and forms the side magnetic circuit part. It can be understood that, in other embodiments, besides the side wall 1342 of the magneto-conduct yoke 134 shown in the drawings, the side magnetic circuit part may also be provided with a side magnet facing the steel magnet 132. In the present application, the vibrating voice coil 122 and the coupling voice coil 124 are electrically independent of each other, that is, they are controlled by different circuits. When the loudspeaker 100 works, the vibrating voice coil 122 is magnetically coupled with the magnetic circuit system 130 under the action of changing current, and the vibrating voice coil 122 is then pulled into the magnetic gap and pushed out of the magnetic gap to drive the diaphragm 121 to vibrate. During the vibration of the diaphragm 121, the coupling voice coil 124 will also be magnetically coupled with the coupling magnetic circuit part 135 under the action of changing current, and also generate upward and downward forces applied to the diaphragm 121 to push and pull the diaphragm 121 upward and downward, so that vibration state of the diaphragm 121, such as the vibration frequency and amplitude, can be adjusted during the high-frequency vibration of the diaphragm 121.

In the technical solution of the present disclosure, the centering support piece 123 is provided in the loudspeaker 100, the opposite sides of the centering support piece 123 are respectively connected with the diaphragm 121 and the vibrating voice coil 122, the coupling voice coil 124 is provided on the centering support piece 123, and the coupling magnetic circuit part 135 corresponding to the coupling voice coil 124 is provided above the central magnetic circuit part 131. Thus, when the loudspeaker 100 works, the coupling voice coil 124 is energized to generate magnetism and can be magnetically coupled with the coupling magnetic circuit part 135, so that when the vibrating voice coil 122 drives the diaphragm 121 to vibrate and make a sound, the coupling voice coil 124 and the coupling magnetic circuit part 135 are magnetically coupled to push and pull and expand the diaphragm 121, thereby changing the vibration state of the high-frequency zone of the diaphragm 121 (suppressing the high-frequency split vibration), and finally improving the high-frequency performance of the loudspeaker 100.

In the present application, the diaphragm 121 comprises: a fixing part 1213 at the outermost part, a central part 1211 at the center part, and a bent ring part 1212 connecting the fixing part 1213 and the central part 1211. The coupling voice coil 124 is of a flat shape and fixedly connected with the central part 1211, that is, the diaphragm 121 is connected with the upper side of the centering support piece 123. In this way, the vibration state of the diaphragm 121 can be adjusted more sensitively and effectively; moreover, the space inside the loudspeaker 100 can be effectively utilized. In other embodiments, the coupling voice coil 124 may also be a three-dimensional structure rather than a flat shape.

Figure 5:
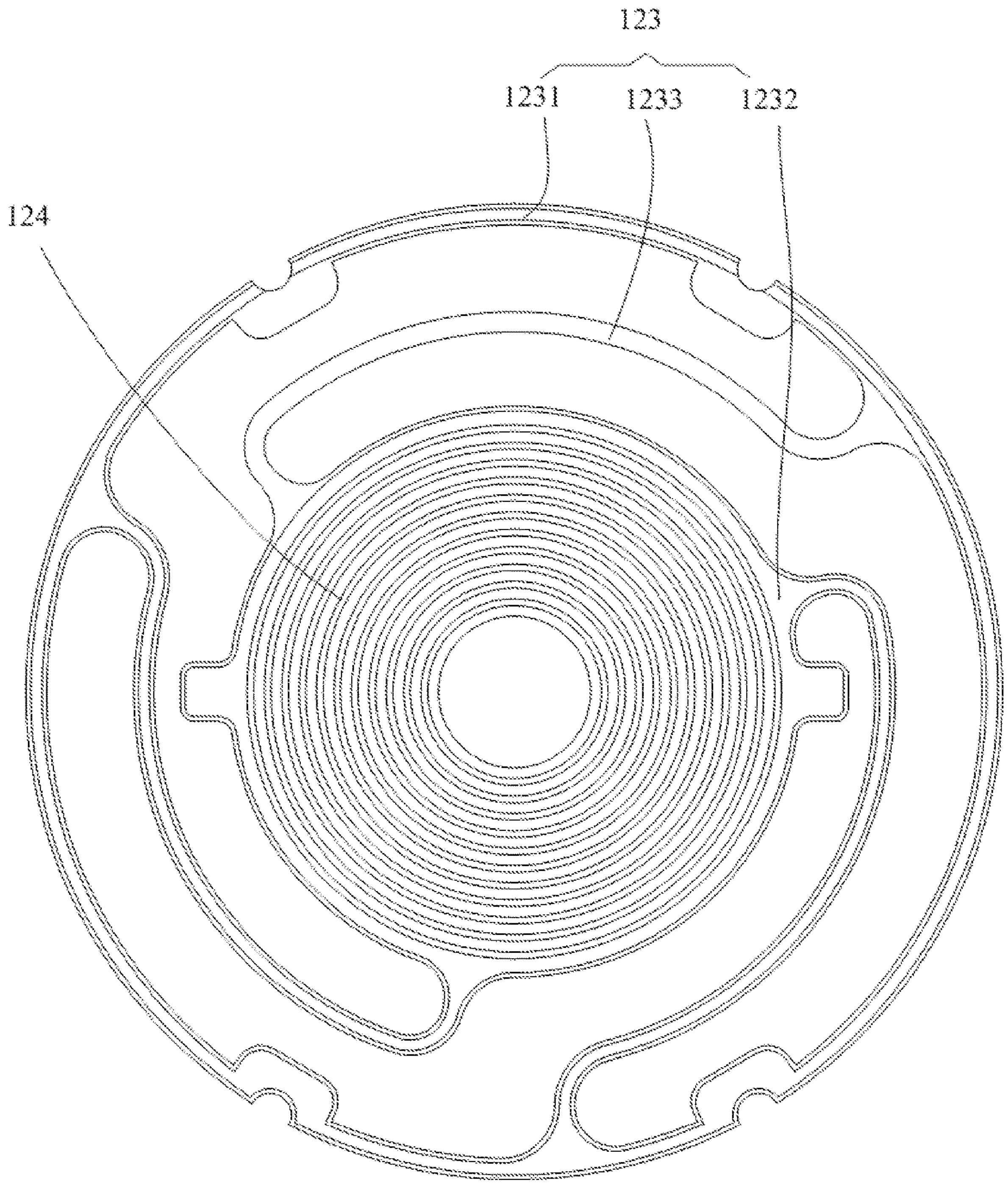
FIG. 5 is an assembly diagram of a centering support piece and a coupling voice coil of the loudspeaker in FIG. 1 according to an embodiment of the present disclosure.

Referring to FIG. 2, FIG. 3 and FIG. 5, in some embodiments, the centering support piece 123 comprises: a frame part 1231 provided at the edges, a mounting part 1232 provided at the center, and an elastic part 1233 connected with the frame part 1231 and the mounting part 1232 at two sides respectively. The frame part 1231 is fixed on the housing 110. The frame part 1231 and the elastic part 1233 are provided with a first conductive wiring electrically connected with the coupling voice coil 124 and a second conductive wiring electrically connected with the vibrating voice coil 122. By providing integrated first and second conductive wirings on the frame part 1231 and the elastic part 1233, the conductive structure is simplified, and the structure of the centering support piece 123 is fully utilized, which is conducive to reducing the cost. The first conductive wiring, the second conductive wiring, and the coupling voice coil 124 may be formed by, for example, copper foil etching, conductive material printing, conductive material plating, etc. In the present application, the coupling voice coil 124 is formed by arranging and winding wirings along a plane where the mounting part 1232 is located. In some embodiments, the coupling voice coil 124 may be embedded inside the centering support piece 123, so that the structure is stronger. In other embodiments, the coupling voice coil 124 may be located on the surface of the centering support piece 123 facing the diaphragm 121, that is, on the upper surface of the centering support piece 123, so that the manufacturing process is easy and convenient.

The coupling design of the coupling magnetic circuit part 135 and the coupling voice coil 124 is as follows.

Figure 4:
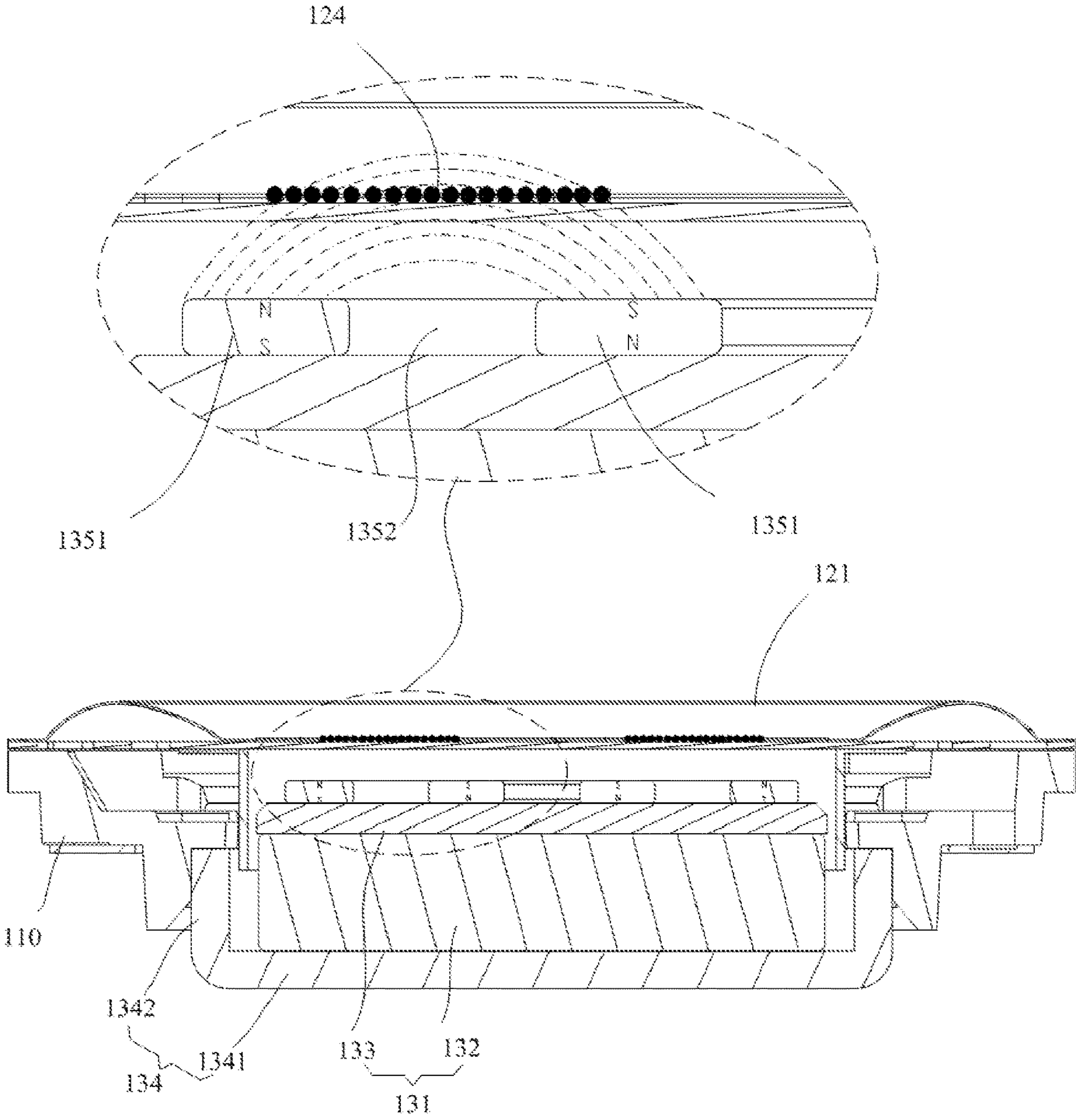
FIG. 4 is a schematic diagram of the coupling principle between a coupling magnetic circuit part and a coupling voice coil of the loudspeaker in FIG. 1.

In some embodiments, referring to FIG. 4, the coupling magnetic circuit part 135 comprises magnets 1351 provided at intervals. A plurality of magnets 1351 are provided at intervals, and a gap 1352 is formed between adjacent magnets 1351. The coupling voice coil 124 comprises a winding part 1241 corresponding to the gap 1352. The magnetic poles of the two adjacent magnets 1351 towards the diaphragm 121 are different. The winding part 1241 on the coupling voice coil 124 corresponding to the gap 1352 has the same current direction when it is energized. Thus, when the coupling voice coil 124 is energized, according to the left-hand rule, the coupling voice coil 124, as an energized conductor, may be subject to upward or downward ampere forces in the magnetic field formed by two adjacent magnets 1351, so as to push the diaphragm 121 upward or pull the diaphragm 121 downward, thereby changing the vibration state of the high-frequency zone of the diaphragm 121, and finally improving the high-frequency performance of the loudspeaker 100.

Figure 6:
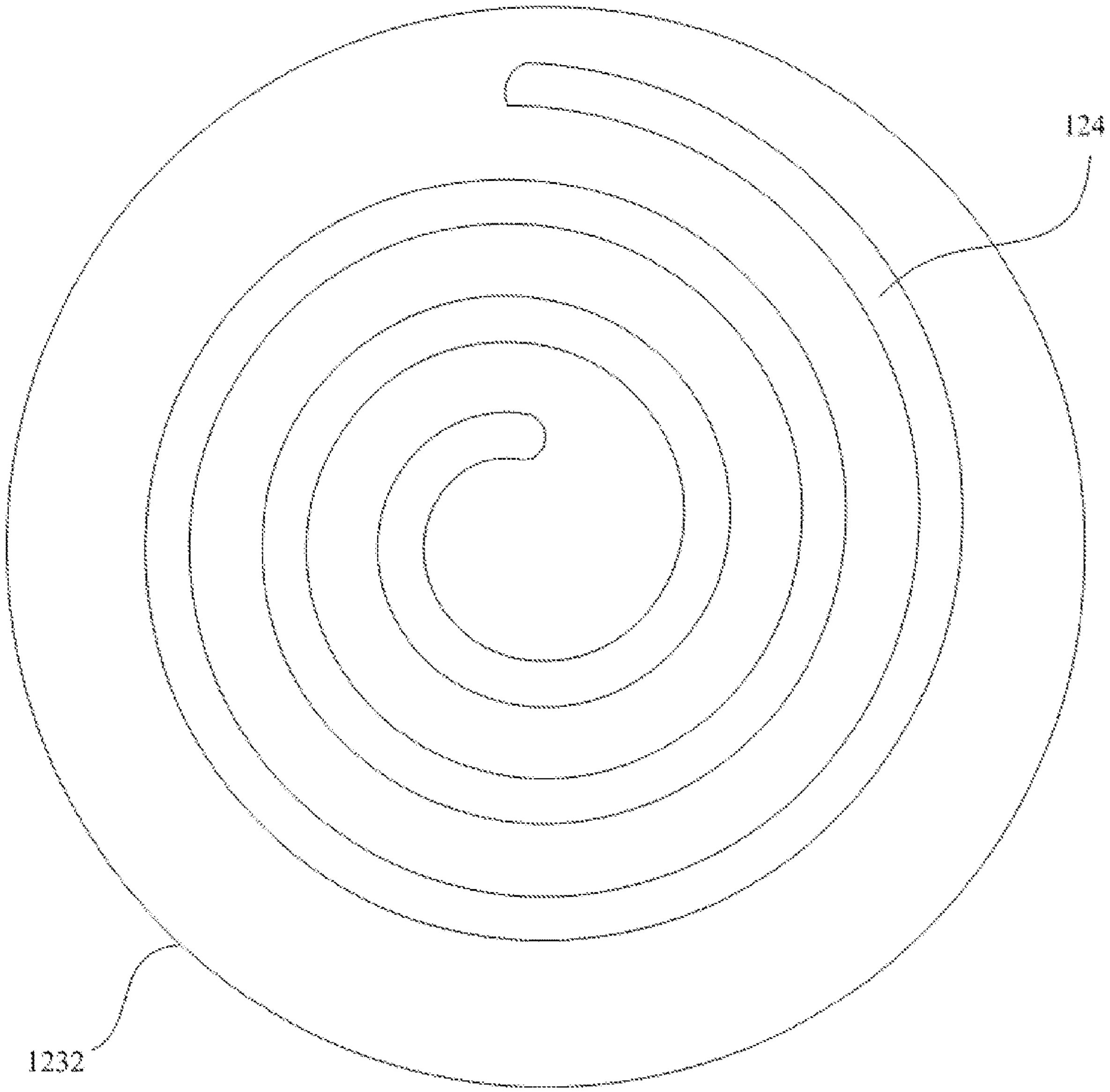
FIG. 6 is a schematic diagram of the winding of the coupling voice coil in FIG. 5.
Figure 7:
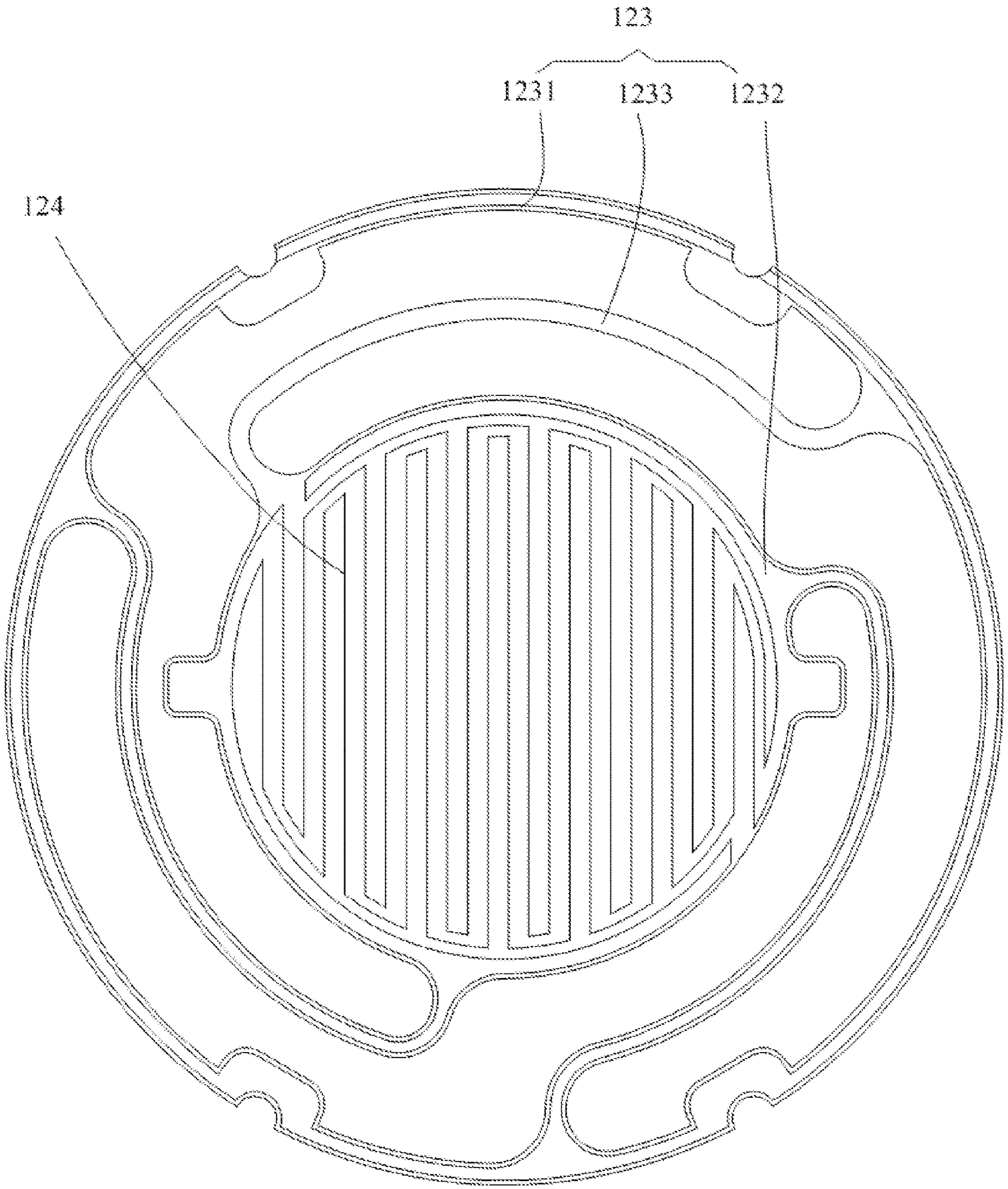
FIG. 7 is an assembly diagram of a centering support piece and a coupling voice coil of the loudspeaker in FIG. 1 according to another embodiment of the present disclosure.

In the above design, the magnets 1351 in the coupling magnetic circuit part 135 are ring-shaped and provided at intervals, and the plurality of magnets 1351 may be concentric rings spaced from each other, while the winding part 1241 of the coupling voice coil 124 is ring-shaped so as to match the magnetic circuit formed by the plurality of magnets 1351 (in the actual winding process, the coupling voice coil 124 forms a ring structure by spiral winding, as shown in FIG. 6). Alternatively, the coupling magnetic circuit part 135 may comprise long strip-shaped magnets 1351 provided at intervals, and the winding part 1241 may be, for example, straight line-shaped as shown in FIG. 7. The two winding methods stated above can make the coupling voice coil 124 occupy the whole mounting part 1232 of the centering support piece 123; moreover, the conductive design of the coupling voice coil 124 is simple, and the adjustment in the vibration process of the vibrating voice coil 122 is more sensitive.

The present disclosure also provides an earphone. The earphone comprises a casing and a loudspeaker 100. An accommodating cavity is provided inside the casing. For the specific structure of the loudspeaker 100, please refer to the above embodiments. Since the loudspeaker 100 adopts all the technical solutions of the above embodiments, it has at least all the beneficial effects brought by the technical solutions of the above embodiments, which will not be repeated here. The loudspeaker 100 is installed in the accommodating cavity. The casing is provided with an acoustic hole corresponding to the diaphragm 121. The earphone may be a portable earphone for mobile phones, tablet computers, etc.

The above only describes optional embodiments of the present disclosure, and does not limit the scope of the present disclosure. All equivalent structural substitutions made based on the contents of the description and drawings of the present disclosure and under the inventive concept of the present disclosure, or directly/indirectly applications in other relevant technical fields shall be included in the scope of patent protection of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A loudspeaker, comprising:

a housing; and a vibration system and a magnetic circuit system that are accommodated in the housing, wherein the vibration system comprises a diaphragm, a centering support piece and a vibrating voice coil, two opposite sides of the centering support piece are respectively connected with the diaphragm and the vibrating voice coil, and the centering support piece is provided thereon with a coupling voice coil;

the centering support piece comprises a mounting part correspondingly connected with the central part of the diaphragm, and the coupling voice coil is provided on the mounting part;

the magnetic circuit system comprises: a magneto-conduct yoke, a central magnetic circuit part and a side magnetic circuit part that are provided on the magneto-conduct yoke, and a coupling magnetic circuit part located above the central magnetic circuit part, and a magnetic gap accommodating the vibrating voice coil is formed between the central magnetic circuit part and the side magnetic circuit part;

when the coupling voice coil is energized, upward and downward forces are generated by magnetic field coupling of the coupling voice coil and the coupling magnetic circuit part.

2. The loudspeaker according to claim 1, wherein the coupling voice coil is of a flat shape, and is formed by arranging and winding wirings along a plane where the mounting part is located.

3. The loudspeaker according to claim 1, wherein the centering support piece comprises a frame part provided at edges, the mounting part provided at center, and an elastic part connecting the frame part and the mounting part at two sides respectively.

4. The loudspeaker according to claim 3, wherein the frame part and the elastic part are provided thereon with a first conductive wiring electrically connected with the coupling voice coil and a second conductive wiring electrically connected with the vibrating voice coil.

5. The loudspeaker according to claim 3, wherein the coupling voice coil is embedded inside the centering support piece; or the coupling voice coil is located on a surface of the centering support piece that is facing the diaphragm.

6. The loudspeaker according to claim 1, wherein the coupling voice coil is formed by etching, printing or plating.

7. The loudspeaker according to claim 1, wherein the coupling magnetic circuit part comprises spaced magnets, a gap is formed between adjacent magnets, and the coupling voice coil comprises a winding part corresponding to the gap.

8. The loudspeaker according to claim 7, wherein the winding part is ring-shaped, the coupling magnetic circuit part comprises ring-shaped magnets provided at intervals, and magnetic poles of two adjacent magnets facing the diaphragm are different;

or, the winding part is of a straight line shape, the coupling magnetic circuit part comprises long striped magnets provided at intervals, and magnetic poles of two adjacent magnets facing the diaphragm are different.

9. The loudspeaker according to claim 1, wherein the central magnetic circuit part comprises a central magnet and a magneto-conduct plate attached to the central magnet, and the coupling magnetic circuit part is fixedly connected to a surface of the magneto-conduct plate facing the diaphragm.

10. An earphone comprising a loudspeaker, wherein the loudspeaker comprises:

a housing; and a vibration system and a magnetic circuit system that are accommodated in the housing, wherein the vibration system comprises a diaphragm, a centering support piece and a vibrating voice coil, two opposite sides of the centering support piece are respectively connected with the diaphragm and the vibrating voice coil, and the centering support piece is provided thereon with a coupling voice coil;

the centering support piece comprises a mounting part correspondingly connected with the central part of the diaphragm, and the coupling voice coil is provided on the mounting part;

the magnetic circuit system comprises: a magneto-conduct yoke, a central magnetic circuit part and a side magnetic circuit part that are provided on the magneto-conduct yoke, and a coupling magnetic circuit part located above the central magnetic circuit part, and a magnetic gap accommodating the vibrating voice coil is formed between the central magnetic circuit part and the side magnetic circuit part;

when the coupling voice coil is energized, upward and downward forces are generated by magnetic field coupling of the coupling voice coil and the coupling magnetic circuit part.

11. The loudspeaker according to claim 10, wherein the coupling voice coil is of a flat shape, and is formed by arranging and winding wirings along a plane where the mounting part is located.

12. The loudspeaker according to claim 10, wherein the centering support piece comprises a frame part provided at edges, the mounting part provided at center, and an elastic part connecting the frame part and the mounting part at two sides respectively.

13. The loudspeaker according to claim 12, wherein the frame part and the elastic part are provided thereon with a first conductive wiring electrically connected with the coupling voice coil and a second conductive wiring electrically connected with the vibrating voice coil.

14. The loudspeaker according to claim 12, wherein the coupling voice coil is embedded inside the centering support piece; or the coupling voice coil is located on a surface of the centering support piece that is facing the diaphragm.

15. The loudspeaker according to claim 10, wherein the coupling voice coil is formed by etching, printing or plating.

16. The loudspeaker according to claim 10, wherein the coupling magnetic circuit part comprises spaced magnets, a gap is formed between adjacent magnets, and the coupling voice coil comprises a winding part corresponding to the gap.

17. The loudspeaker according to claim 16, wherein the winding part is ring-shaped, the coupling magnetic circuit part comprises ring-shaped magnets provided at intervals, and magnetic poles of two adjacent magnets facing the diaphragm are different;

or, the winding part is of a straight line shape, the coupling magnetic circuit part comprises long striped magnets provided at intervals, and magnetic poles of two adjacent magnets facing the diaphragm are different.

18. The loudspeaker according to claim 10, wherein the central magnetic circuit part comprises a central magnet and a magneto-conduct plate attached to the central magnet, and the coupling magnetic circuit part is fixedly connected to a surface of the magneto-conduct plate facing the diaphragm.

* * * * *